Jan. 10, 1967  T. MALININ  3,296,821
MICROTOME INCLUDING FREEZING ATTACHMENTS
Filed May 5, 1965
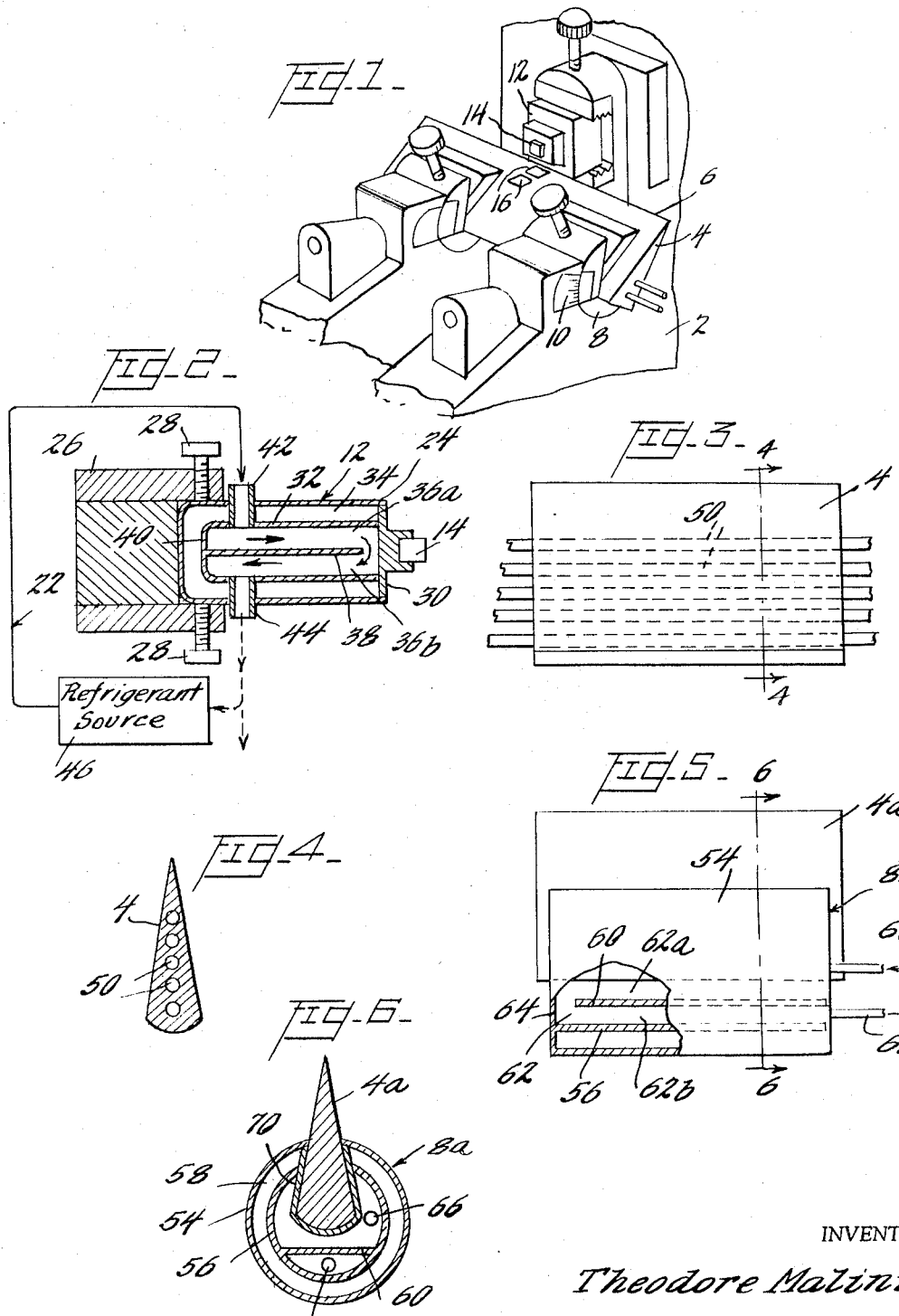
INVENTOR
Theodore Malinin,
BY Hugo E. Neuberger
ATTORNEY United States Patent Office 3,296,821
Patented Jan. 10, 1967

3,296,821
MICROTOME INCLUDING FREEZING
ATTACHMENTS
Theodore Malinin, 1912 Swan Terrace,
Alexandria, Va. 22307
Filed May 5, 1965, Ser. No. 453,316
8 Claims. (Cl. 62—320)

This invention relates to microtomes and to novel cryogenic refrigerated freezing attachments for microtome knives and specimen holders.

In the preparation of frozen sections of tissue or other materials for microscopic examination, the tissue is customarily frozen on freezing type microtomes provided with a freezing stage or table, and also with knife cooling means. The freezing stage is usually a horizontally disposed table on the upper surface of which the specimen to be sliced is placed or clamped, the stage being provided with internal passages through which a refrigerant gas, such as for example, carbon dioxide, is passed to the outside atmosphere. The cutting knife is usually cooled by means of a stream of a refrigerant gas directed at its surface. It has also been proposed to provide the cutting knife with a longitudinal internal main channel having a plurality of branch channels extending through the body of the blade to its surface, a refrigerant gas being introduced into the main channel for cooling purposes.

In biological and pathological examination it is often necessary to section frozen viable tissues and to use means to minimize ice crystal growth during freezing. Formation of large ice crystals produces artifacts in tissue sections. In addition, specimens must be frozen at a predetermined rate. In order to protect such tissues from freezing damage there may be incorporated therewith additives such as glycerol, dimethyl sulfoxide, and the like, which act as freezing point depressants, lowering the freezing temperatures so that the specimens are still soft at temperatures of $-20°$ C. to $-30°$ C. Thus it becomes necessary to cool such treated specimens to temperatures considerably below the conventional temperatures at which freezing microtomes are operated using conventional refrigerants.

The refrigerating arrangements on known types of freezing microtomes are of the open type, in which the refrigerating gas such as carbon dioxide blows through the freezing stage passages and thence to the atmosphere, and in which cooling gas blown against the knife edge also passes into the atmosphere. This open type of gas system has the disadvantage of being difficult to control and of freezing the entire mechanism. Moreover, its operating characteristics make it difficult for the microtome to provide sufficiently thin sections. Another disadvantage is that where carbon dioxide is used it may come into direct contact with the tissue sample, and in many instances carbon dioxide changes the pH of tissues in high concentrations. It does not provide the same temperature of knife and specimen necessary for successful sectioning.

Where it becomes necessary or desirable to avoid difficulties encountered with open freezing microtomes, the entire microtome may be placed in a cryostat having mechanical refrigeration means. However, this is also disadvantageous because there is a lower limit of temperature below which a mechanically refrigerated cryostat will not operate, usually $-30°$ C., the hands of the operator must be exposed to the low temperatures, and the entire microtome is frozen, solidifying the lubricants and rendering the device inoperative; if the temperature is reduced further, no means for controlling the rate of cooling are provided.

A principal object of the present invention is to provide a microtome in which the specimen holder and the cutting knife as well may be cooled to substantially the same temperatures while avoiding the difficulties of open gas cooling.

Another object is to provide a freezing microtome in which the specimen holder and the knife can be maintained at the same temperature, but which will not expose the hands of the operator or the microtome itself to a cold environment.

Still another object is to provide a cryogenic refrigerated freezing attachment for both the specimen holder and the knife, permitting the use of extremely low temperatures and a controlled rate of cooling and freezing.

Another object is to provide an improved method of cooling microtome knives and specimen holders.

In accordance with the invention there is provided a novel cryogenically refrigerated specimen holder which can either be mounted in the object clamp of a conventional microtome, or which can replace the entire object holding assembly. There is also provided a novel cryogenically cooled microtome knife. These devices of the invention may be employed in conjunction with known types of microtomes, such as rotary, rocking, or carriage types, but are particularly adapted to form a part of rotary (Minot) types of microtomes.

The term cryogenic as employed herein refers to gas-liquid systems capable of producing very low temperatures, examples of which are liquid nitrogen, boiling point $-196°$ C., liquid oxygen, boiling point $-183°$ C., and liquid helium, boiling point $-268°$ C. The liquid refrigerant is supplied to the cooling vessel or system, is vaporized therein, and the vapors may, if desired, be recovered and recycled. Thus, in the cryogenic specimen holder and blade cooling systems of the invention, the cooling system is closed and the gases do not come into contact with either the operator, or the specimen to be frozen, or the microtome itself.

The temperatures of the knife and of the sample can be approximated to a fraction of a degree by independent adjustment of both cooling systems, and can be accurately monitored by placing thermocouples in the knife and on the plate on which the specimen is frozen.

Other objects and advantages of the invention will become apparent from a study of the following specification when considered in conjunction with the accompanying drawing, in which:

FIG. 1 is a detailed front perspective view of the microtome of the present invention;

FIG. 2 is a sectional view of the specimen holder, a closed cryogenic refrigeration circuit being illustrated schematically;

FIG. 3 is an elevational view of one embodiment of a cooled microtome knife blade;

FIG. 4 is a sectional view taken along line 4—4 of FIG. 3;

FIG. 5 is a partially broken away elevational view of additional means for cooling a microtome knife blade; and FIG. 6 is a sectional view taken along line 6—6 of FIG. 5.

Referring first to FIG. 1, the basic microtome apparatus is of conventional construction and includes a frame 2 for supporting a stationary knife blade 4 that is mounted at an angle and is provided at its upper side with a horizontal cutting edge 6. The knife blade is supported for angular adjustment relative to the frame by a conventional generally-cylindrical knife holder 8 that is accurately adjustable about its longitudinal axis to various cutting positions as indicated by indicia means 10.

Movably mounted in the frame 2 opposite and normal to the knife edge 6 is a cooled specimen holder 12 which carries at its free end a specimen 14 from which thin sections 16 are to be severed by the stationary knife 4. The horizontal specimen holder 12, as is conventional in the art, is vertically reciprocated and longitudinally indexed (in the direction of the knife edge) by conventional reciprocating and indexing means (not shown). The specimen sections 16 severed by the movement of holder 12 relative to knife 4 are collected.

Referring now to FIG. 2, in accordance with the present invention, the specimen holder 12 is connected in a closed cryogenic refrigeration system 22 for cooling the specimen 14 to extremely low temperatures. The specimen holder comprises a hollow metal body 24 (of a suitable metal, such as stainless steel) that is clamped at one end in the reciprocatory, indexed element 26 by bolts 28. In the embodiment shown, the other end wall 30 of the body 24 is provided with means for carrying the specimen 14. It will be understood that, if desired, the specimen carrying means may be mounted upon the hollow metal body 24 itself, at a suitable position. Connected at one end with the inner surface of end wall 30 is a hollow jacket element 32 that is spaced from the other walls of the body to define a chamber 34, which may be either evacuated or provided with suitable insulating material. Jacket element 32 contains an expansion chamber 36 that is divided in half to define passages 36a and 36b by a partition wall 38 that extends longitudinally from the other end wall 40 of the jacket to a point adjacent but spaced from the specimen-carrying end wall 30. Adjacent the end wall 40, the body 24 includes inlet and outlet passages 42 and 44 that communicate with expansion chamber passages 36a and 36b.

The body 24 is connected, by means of inlet 42 and outlet 44, in a closed refrigeration system including a refrigerant source 46, such as, for example, a cylinder of liquefied gas. Preferably the refrigerant of the system 22 is of the cryogenic type, such as liquid nitrogen, liquid oxygen, or liquid helium. Consequently, in the system of FIG. 2, as the liquid is introduced into the chamber 36 via inlet 42 and is expanded to the gaseous state, heat is withdrawn from the end wall 30 and the specimen 14 carried thereby, whereby the temperature of the specimen may be reduced to a very low value (less than −150° C.). The gases flowing through passage 36b and outlet 44 are either vented to the atmosphere, or collected and returned to the refrigerant source.

As shown in FIG. 3, if desired the knife 4 may be provided with one or more tubes 50 through which the refrigerant is conducted to lower the temperature of the knife blade. It is apparent that as many separate tubes as required to attain the desired low temperature may be provided. The refrigerant flowing through the tubes 50 will ordinarily be the fluid of the closed refrigeration system of FIG. 2. In this instance, the tubes 50 of the knife blade are connected in the refrigeration system 22 between the specimen holder inlet and the refrigerant source. The knife 4 is formed of a suitable heat-conductive metal, such as, for example, stainless steel.

Referring now to FIGS. 5 and 6, the blade 4a may also be cooled by closed cycle cooling means associated with the adjustable blade holder 8a. More particularly, the outer wall 54 of a suitable heat-conductive metal, such as, for example, stainless steel, of blade holder 8a is jacketed by the concentrically spaced inner jacket element 56 that defines an evacuated or other insulating space 58. The knife element 4a is inserted into a receptacle defined by wall 70 extending into the blade holder 8a, as shown. Partition wall 60 extends longitudinally from end wall 61 of the chamber 62 within jacket element 56, and terminates adjacent, but spaced from the other end wall 64, to define passages 62a and 62b. When the inlet and outlet conduits 66 and 68 are connected in a closed cryogenic refrigeration system (similar to that of FIG. 2) between the pump outlet and the compressor inlet, the refrigerant will expand from the liquid to the gaseous state as it flows from the inlet to the outlet via passages 62a and 62b, thereby withdrawing heat from blade 4a to cool the same to a very low temperature. While the knife 4a of FIGS. 5 and 6 has been illustrated as being solid, cooling passages similar to the passages 50 of FIG. 3 may be provided for the flow of refrigerant, if desired.

For simplicity of illustration, the various seals and connections of the closed refrigeration systems have been purposely omitted. The details of the sealing means, however, are well known in the prior art and do not constitute the novelty of the present invention.

While in accordance with the provisions of the Patent Statutes, the preferred forms and embodiments of the invention has been illustrated and described, it will be apparent to those skilled in the art that various changes may be made in the apparatus described without deviating from the inventions set forth in the following claims.

What is claimed is:

1. Microtome apparatus adapted to maintain the specimen to be cut at a very low temperature, comprising, in combination:
   (a) a knife member;
   (b) a frame for supporting a specimen holder;
   (c) a specimen holder adapted to carry a specimen and containing a partitioned expansion chamber and inlet and outlet passages communicating with said expansion chamber for connecting the same as a functional component of a closed cryogenic refrigeration system;
   (d) means for moving said specimen holder relative to said knife member to sever thin sections from the specimen; and
   (e) closed circuit cryogenic refrigeration means including a cryogenic refrigerant gas having a liquefaction temperature of the order of about minus 183° C. and lower, in communication with said specimen holder.

2. The apparatus of claim 1 in which said knife member includes cooling means in communication with said closed circuit refrigeration means.

3. Microtome apparatus adapted to maintain the specimen to be cut at very low temperature, comprising in combination:
   (a) a knife member;
   (b) a frame for supporting a specimen holder;
   (c) a specimen holder containing an expansion chamber and inlet and outlet passages communicating with said expansion chamber for connecting the same as a functional component of a closed cryogenic refrigeration system, said expansion chamber including a first end wall the external surface of which is adapted to carry the specimen, said specimen holder including a partition extending axially of said chamber from the other end wall thereof toward and spaced from said first end wall, said inlet and outlet being adjacent the other end wall on opposite sides of said partition, respectively, whereby the refrigerant of said system entering said chamber through said inlet is directed along one side of said partition toward said first end wall, and away from said first end wall along the other side of said partition toward said outlet;
   (d) means for moving said specimen holder relative to said knife member to sever thin sections from the specimen; and
   (e) closed circuit cryogenic refrigeration means including a cryogenic refrigerant gas having a liquefaction temperature of the order of about minus 183° C. and lower, in communication with said specimen holder.

4. The apparatus of claim 3 in which said specimen holder further includes jacket means connected with said first end wall for defining an insulating space around the other walls of said expansion chamber.

5. The apparatus of claim 3 in which said knife member includes cooling means in communication with said closed circuit refrigeration means.

6. A specimen holder for a microtome adapted to maintain the specimen to be cut at very low temperature, comprising an expansion chamber and inlet and outlet passages communicating with said expansion chamber for connecting the same as a functional component of a closed cryogenic refrigeration system, said expansion chamber including a first end wall the external surface of which is adapted to carry the specimen, said specimen holder including a partition extending axially of said chamber from the other end wall thereof toward and spaced from said first end wall, said inlet and outlet being adjacent the other end wall on opposite sides of said partition, respectively, and jacket means connected with said first end wall for defining an insulating space around the other walls of said expansion chamber.

7. A microtome knife adapted to operate at very low temperature, comprising a knife blade, and means for cooling said knife blade including a blade holder member adapted to receive the blunt end of said knife, and containing inlet and outlet passages communicating with an expansion chamber for connecting the same as a functional component of a closed cryogenic refrigeration system, said expansion chamber at least partially surrounding said blade holder member and including end walls and a partition extending axially of said chamber from one end wall thereof toward and spaced from the other end wall, said inlet and outlet being on opposite sides of said partition, respectively, whereby the refrigerant of said system entering said chamber through said inlet is directed along one side of said partition toward said first end wall, and away from said first end wall along the other side of said partition toward said outlet, and jacket means defining an insulating space surrounding said expansion chamber.

8. The knife of claim 7 in which knife contains at least one internal passage for refrigerant connected to said closed refrigeration system.

References Cited by the Examiner

UNITED STATES PATENTS

| 1,835,323 | 12/1931 | Olson et al. | 165—142 X |
| 2,629,230 | 2/1953 | Turner | 83—170 X |
| 3,006,157 | 10/1961 | Haettinger et al. | |
| 3,220,290 | 11/1965 | Shandon | 83—915.5 X |

FOREIGN PATENTS 768,337    2/1957    Great Britain.

LLOYD L. KING, *Primary Examiner.*

ROBERT A. O'LEARY, *Examiner.*

N. R. WILSON, *Assistant Examiner.*